US007929291B2

(12) United States Patent
Park et al.

(10) Patent No.: US 7,929,291 B2
(45) Date of Patent: Apr. 19, 2011

(54) CRADLE FOR A PORTABLE TERMINAL (75) Inventors: Hyeong-Soo Park, Gumi-si (KR);
Chang-Heum Byun, Gumi-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 135 days.

(21) Appl. No.: 12/260,634

(22) Filed: Oct. 29, 2008

(65) Prior Publication Data

US 2009/0129010 A1 May 21, 2009

(30) Foreign Application Priority Data

Nov. 16, 2007 (KR) .................. 10-2007-0117483

(51) Int. Cl.
*G06F 1/16* (2006.01)
*H05K 5/00* (2006.01)
*H05K 7/00* (2006.01)

(52) U.S. Cl. ................................ 361/679.41
(58) Field of Classification Search ............. 361/679.01, 361/679.02, 679.08, 679.4, 679.41; 439/374; 710/303
See application file for complete search history.

(56) References Cited

U.S. PATENT DOCUMENTS

| 5,841,424 | A * | 11/1998 | Kikinis ................... 345/168 |
| 6,457,996 | B1 * | 10/2002 | Shih ...................... 439/638 |
| 6,614,649 | B1 * | 9/2003 | Wang ................... 361/679.11 |
| 6,632,037 | B2 * | 10/2003 | Lin et al. ................. 400/472 |
| 6,674,636 | B2 * | 1/2004 | Loo ................... 361/679.14 |
| 6,714,404 | B1 * | 3/2004 | Wu .................... 361/679.09 |
| 6,877,919 | B2 * | 4/2005 | Sitalasai et al. ............ 400/472 |
| 6,914,777 | B2 * | 7/2005 | Hsu .................... 361/679.4 |
| 2002/0020789 | A1 * | 2/2002 | Li ...................... 248/175 |
| 2002/0109961 | A1 * | 8/2002 | Glad ................... 361/680 |
| 2003/0095380 | A1 * | 5/2003 | Chen et al. ............... 361/686 |
| 2004/0066611 | A1 * | 4/2004 | Wu .................... 361/680 |
| 2008/0285213 | A1 * | 11/2008 | Tan et al. ................ 361/680 |

* cited by examiner

*Primary Examiner* — Jayprakash N Gandhi
*Assistant Examiner* — Adrian S Wilson
(74) *Attorney, Agent, or Firm* — H.C. Park & Associates, PLC (57) ABSTRACT A cradle for a portable terminal is provided. The cradle includes a base, an inclined support installed on the base, and a connector. The inclined support supports the portable terminal when the portable terminal is mounted in the cradle. The connector has a protruding portion that protrudes toward one surface of the inclined support, and the connector contacts an interface connector of the portable terminal when the portable terminal is mounted in the cradle. The connector pivots on the inclined support.

17 Claims, 7 Drawing Sheets

CRADLE FOR A PORTABLE TERMINAL

CROSS-REFERENCE TO RELATED APPLICATION

This application claims priority from and the benefit of Korean Patent Application No. 10-2007-0117483, filed on Nov. 16, 2007, which is hereby incorporated by reference for all purposes as if fully set forth herein.

BACKGROUND OF THE INVENTION

1. Field of the Invention

The present invention relates to a portable terminal such as an electronic note-taking device, a portable game player, a Digital Multimedia Broadcasting (DMB) phone, a game phone, a chatting phone, a Moving Pictures Expert Group Layer 3 (MP3) phone, a cellular phone, a Personal Communication Services (PCS), a Personal Digital Assistant (PDA), or a Hand-Held Phone (HHP). More particularly, the present invention relates to a cradle to charge a portable terminal or connect the portable terminal to another device.

2. Discussion of the Background

In addition to a mobile communication function, a variety of terminals that are specialized in particular functions are used, such as an electronic note-taking device specialized in schedule management or a Portable Multimedia Player (PMP) specialized in gaming or playing multimedia. Typically, "portable terminal" refers to an electronic device that a user carries and uses to wirelessly communicate with another party.

Owing to increased integration levels of circuits and the development of wireless communication technology that enables high-speed, large-volume information transmission, portable terminals are advancing to support finance functions such as small-sum payments while also functioning as all of an electronic note-taking device, a multimedia player, and a mobile communication terminal.

Conventionally, portable terminals may be classified as bar-type, flip-type, or foldertype according to their appearance. A bartype terminal has a single bar-shaped housing. A flip housing is rotatably engaged with a bar-shaped housing by a hinge device in a flip-type terminal. A folder-type terminal is configured so that a folder is rotatably connected to a single bar-shaped housing by a hinge device to be folded over or unfolded from the housing. Together with the folder-type terminal, a sliding-type terminal with a pair of housings in slidable engagement is gaining a high market share. Also, the advent of a swing-type terminal contributes to meeting various user tastes.

The proliferation of portable terminals has led to the reinforcement of portable terminal-based commercial services, for example, multimedia functions including gaming, moving picture playing, and music file reproduction. Therefore, users may enjoy portable terminals for a variety of purposes and mobile communication service providers may have new profit opportunities.

Although servicing multimedia users, portable terminals may not be effective in providing diverse multimedia services.

For example, portable terminals may be miniaturized to enhance portability but their small size may be an obstacle to installation of a display large enough to view broadcast programs or moving pictures. Moreover, a small portable terminal has limitations in offering high-quality sound when a user enjoys music. That is, there is a difficulty in installing a speaker of a size great enough to provide high capacity and high-quality sound in a small portable terminal.

With the limited capacity of a storage medium in a portable terminal due to its miniaturization, large-volume moving picture files may be difficult to store. That is, if a portable terminal is equipped with a semiconductor storage medium like a high-capacity flash memory, its cost may increase. On the other hand, if a cheap and large-capacity storage medium like a hard disk relative to a flash memory is used for the portable terminal, the portable terminal may get heavier and larger, thereby impairing portability.

Consequently, even if a portable terminal has a multimedia player function, it may not perform fully because of limits on output devices such as a display or a speaker and limited storage capacity.

SUMMARY OF THE INVENTION

The present invention provides a cradle to enable efficient use of various multimedia functions in a portable terminal.

The present invention also provides a cradle to facilitate connection of a portable terminal to various media including an external speaker and an external hard disk.

The present invention also provides a cradle to facilitate installation and detachment of a portable terminal.

Additional features of the invention will be set forth in the description which follows, and in part will be apparent from the description, or may be learned by practice of the invention.

The present invention discloses a cradle for a portable terminal including a base, an inclined support, and a connector. The inclined support is installed on the base to support the portable terminal when the portable terminal is mounted in the cradle. The connector has a protruding portion that protrudes toward one surface of the inclined support to contact an interface connector of the portable terminal when the portable terminal is mounted in the cradle. The connector pivots on the inclined support.

The present invention also discloses a cradle for a portable terminal including a base, an inclined support installed on the base, and a pivotable connector. The inclined support supports the portable terminal when the portable terminal is mounted in the cradle, and the pivotable connector has a protruding portion to couple with an interface connector of the portable terminal when the portable terminal is mounted in the cradle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
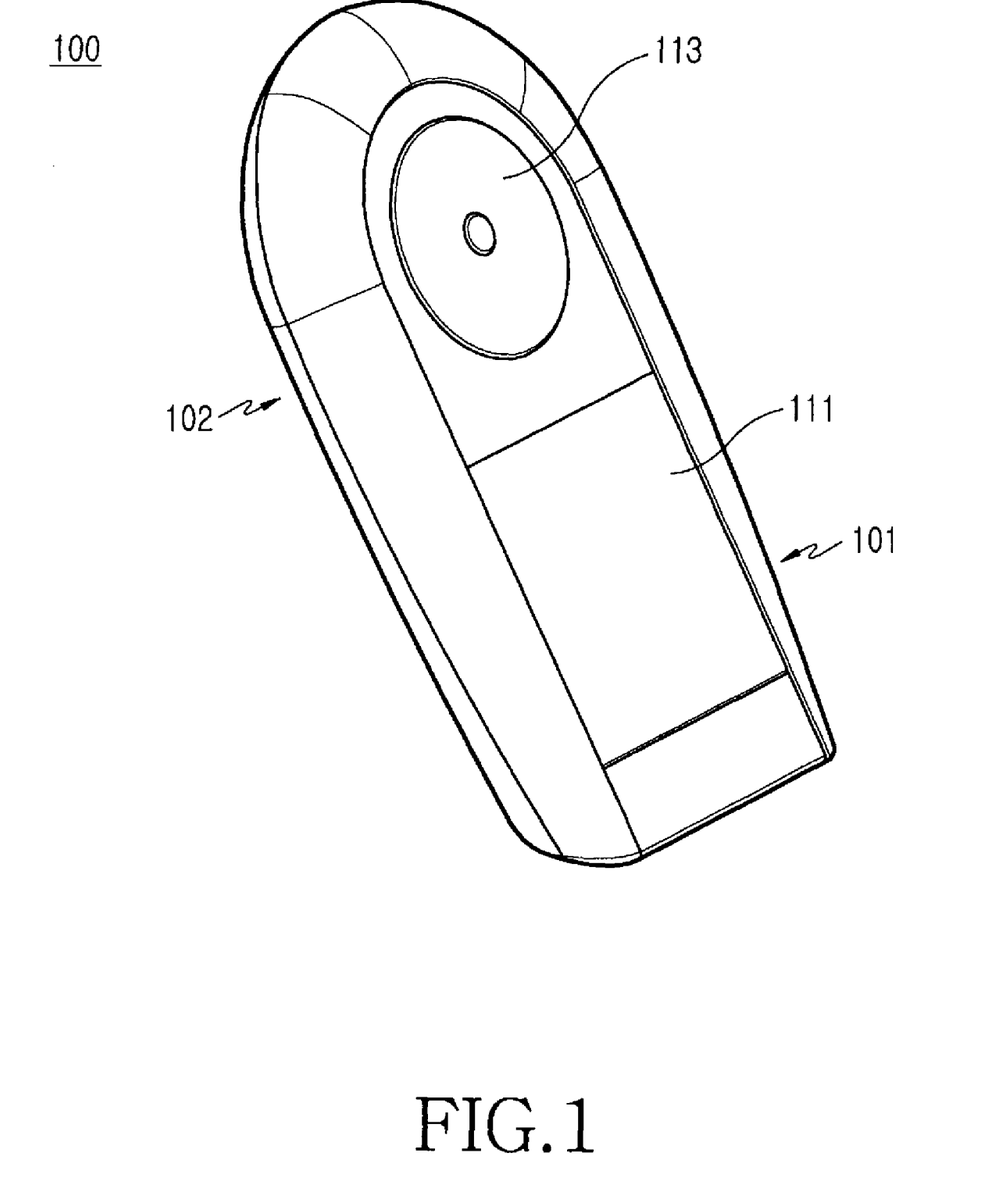
FIG. 1 is a perspective view of a type of portable terminal that may be mounted in a cradle according to an exemplary embodiment of the present invention.
Figure 2:
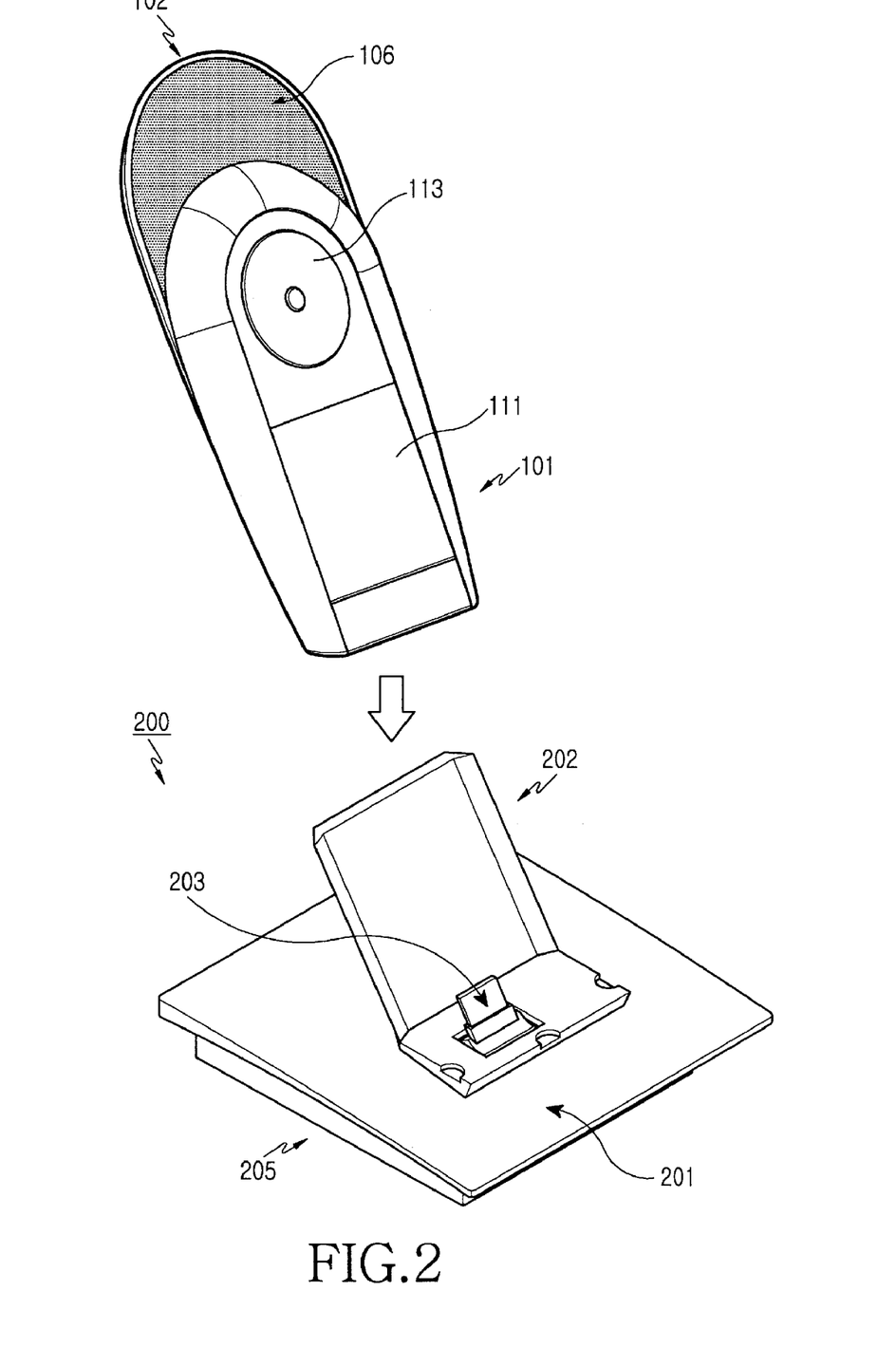
FIG. 2 is a perspective view of the portable terminal shown in FIG. 1 being mounted in a cradle.
Figure 3:
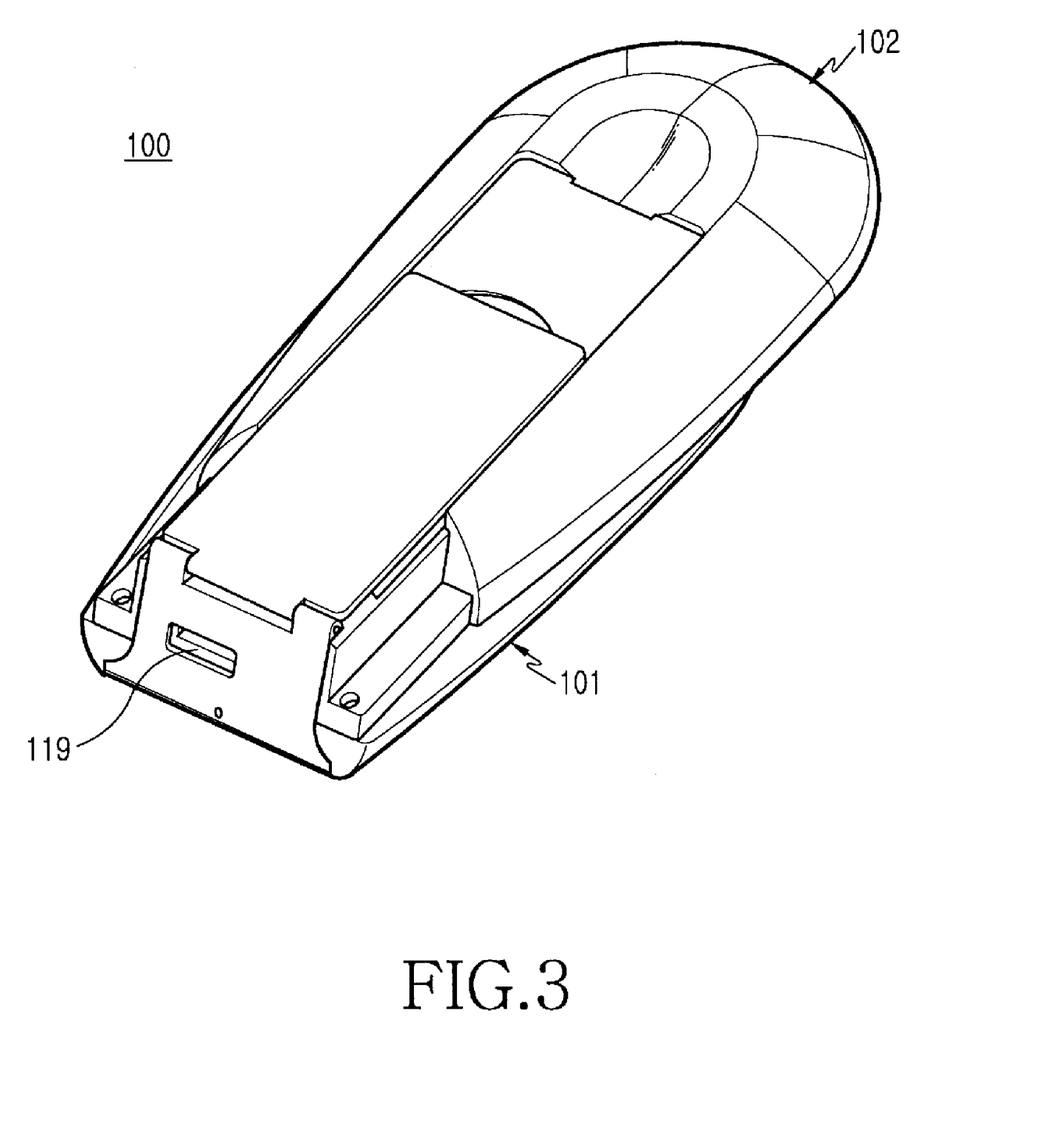
FIG. 3 is a perspective view of the rear of the portable terminal shown in FIG. 2 detached from the cradle.

FIG. 1, FIG. 2, and FIG. 3 show a type of portable terminal 100 that can be mounted in a cradle according to an exemplary embodiment of the present invention.

Referring to FIG. 1, FIG. 2, and FIG. 3, the portable terminal 100 includes a first housing 101 and a second housing 102. One surface of the second housing 102 is partially opened as the second housing 102 slides along the first housing 101. The first housing 101 is provided with a display 111 and a keypad 113 on a front surface thereof. A speaker 106 is provided in the second housing 102 and it is opened and closed by the sliding movement of the second housing 102. That is, the second housing 102 is engaged on a rear surface of the first housing 101 so as to slide, and with the sliding of the second housing 102, the speaker 106 may be selectively opened above the first housing 101.

An interface connector 119 is installed on a bottom surface of the first housing 101 to provide connectivity to a battery charger, a data cable, etc.

Referring to FIG. 2, the portable terminal may be mounted on the cradle 200. The mounting and detachment of the portable terminal 100 on and from the cradle 200 will be described below in more detail with reference to FIG. 5.

Figure 4:
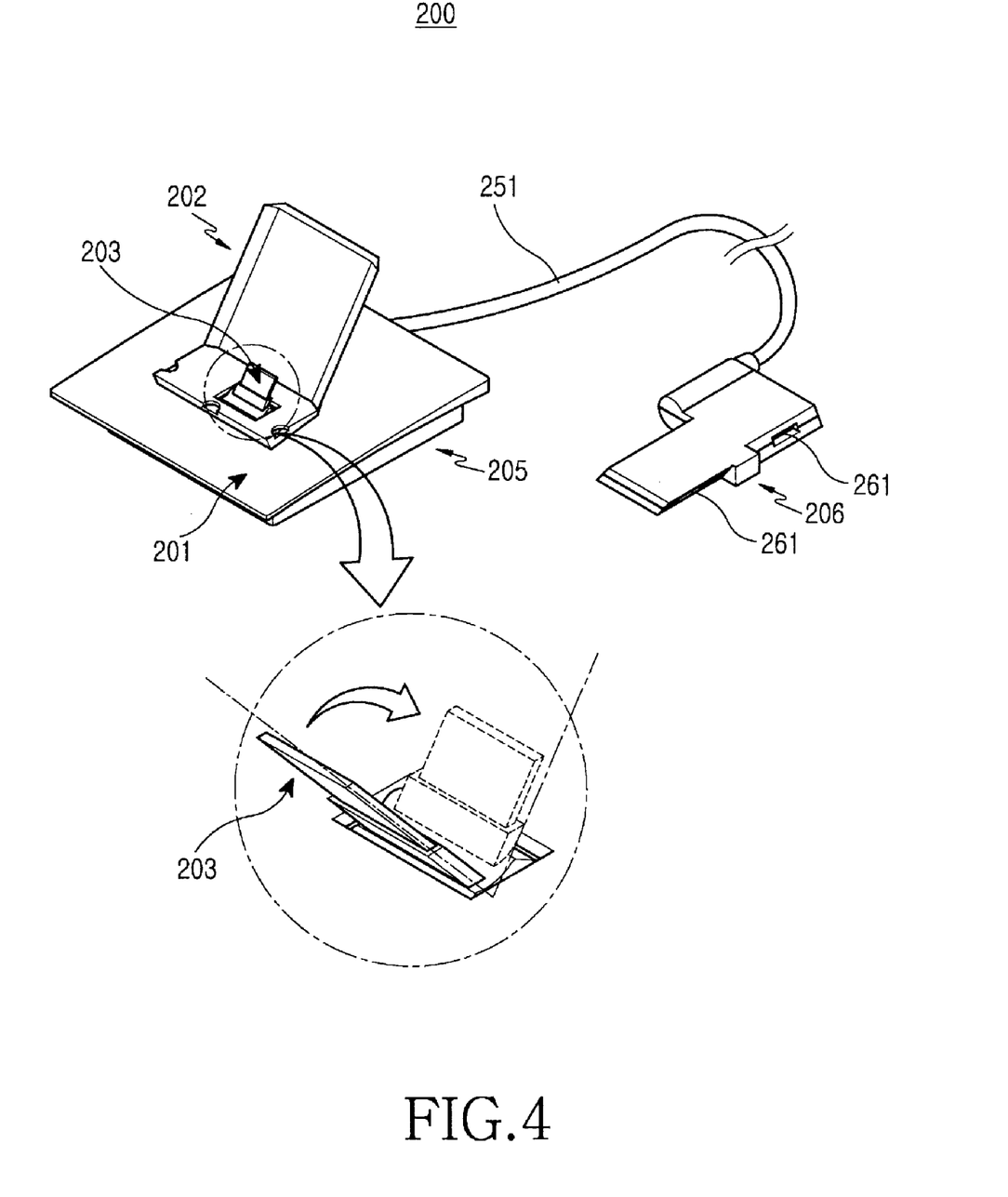
FIG. 4 is a perspective view of the cradle shown in FIG. 2.
Figure 5:
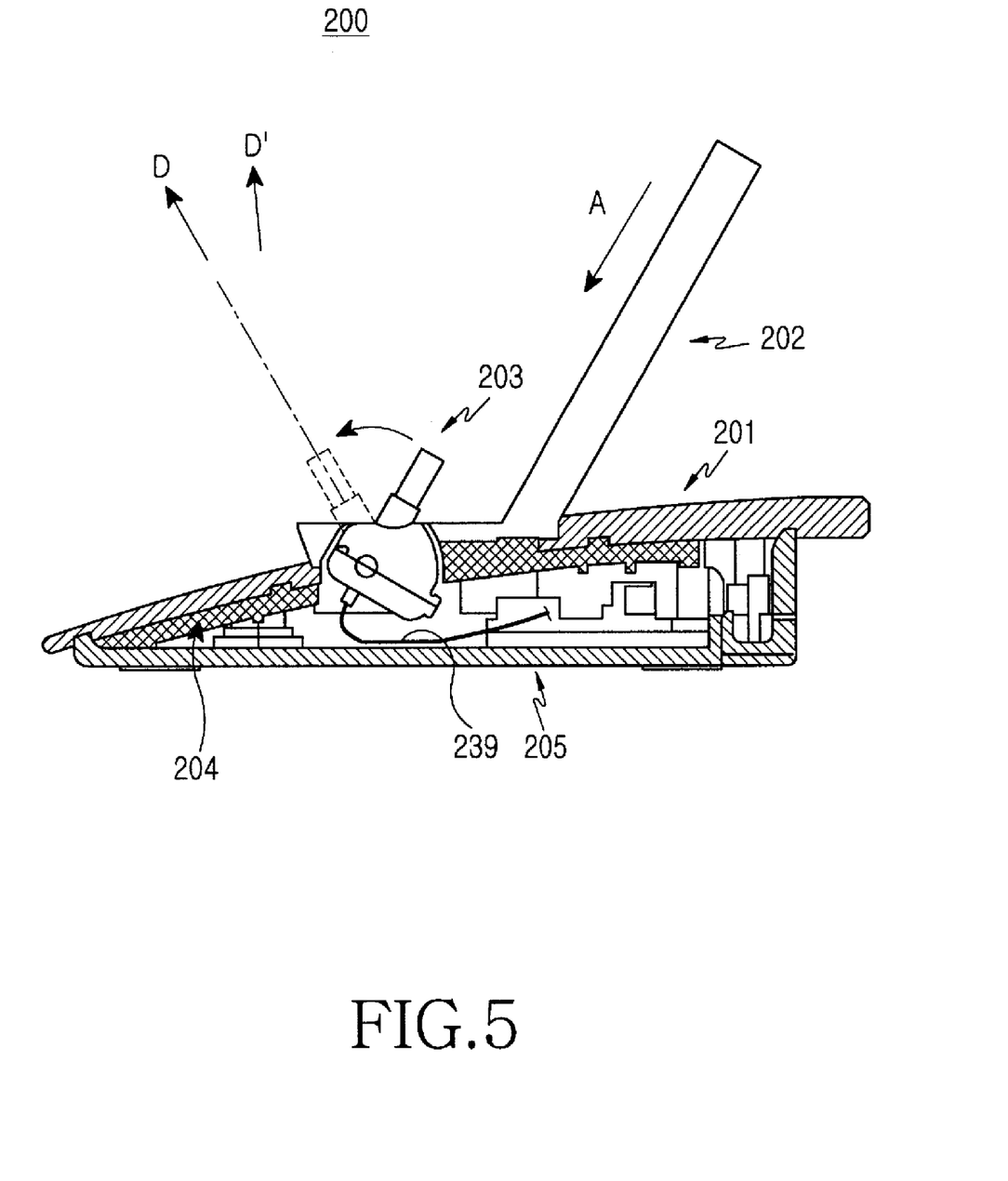
FIG. 5 is a sectional view of the cradle shown in FIG. 4.
Figure 6:
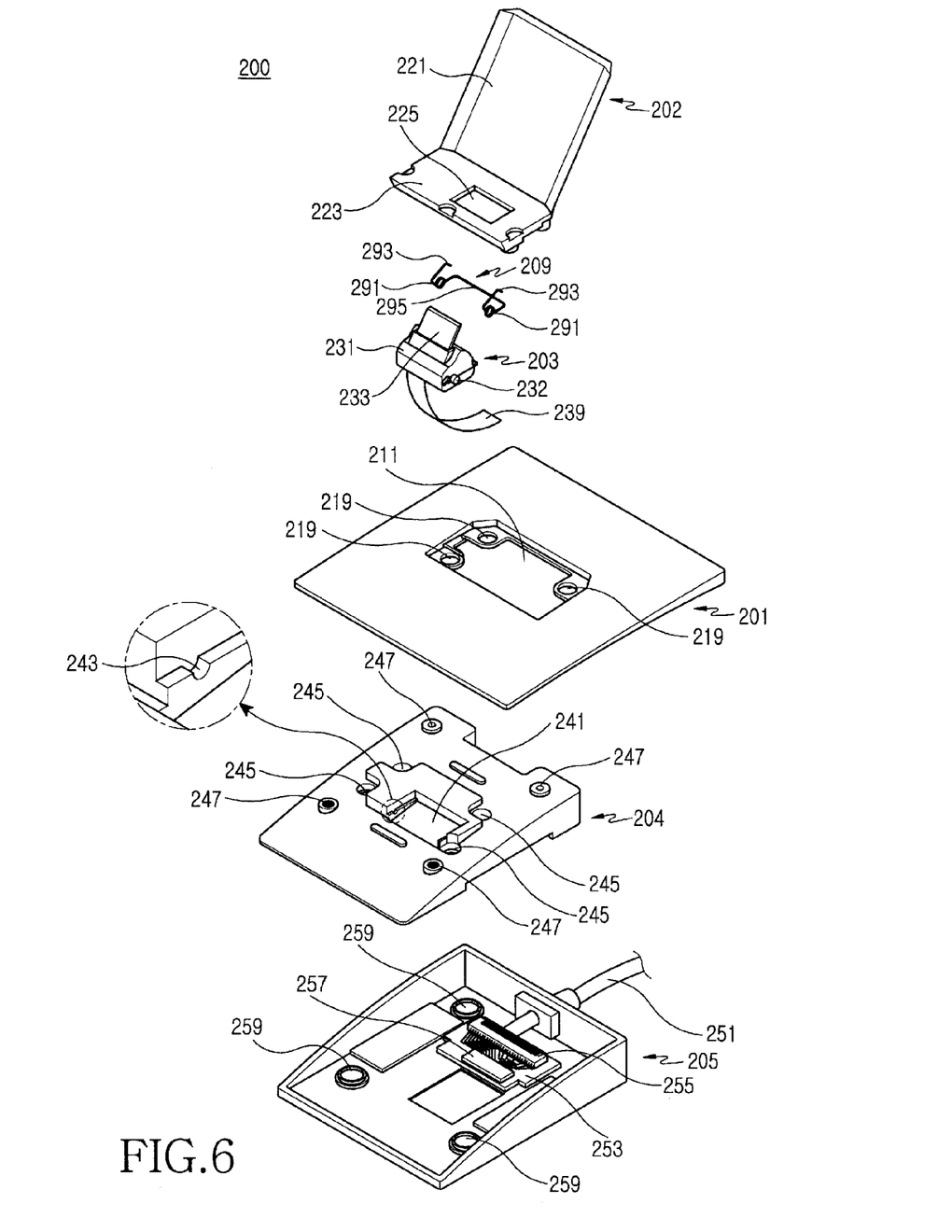
FIG. 6 is an exploded perspective view of the cradle shown in FIG. 4.

With reference to FIG. 4, FIG. 5, and FIG. 6, the configuration of the cradle 200 will be described. Referring to FIG. 4, FIG. 5, and FIG. 6, a connector 203 is installed pivotably with respect to a base 201 or an inclined support 202 in the cradle 200.

The base 201 gives a main outward look to the cradle 200. A top surface of the base 201 may be curved. The inclined support 202 is installed on one surface of the base 201, specifically on the top surface of the base 201, and at least one surface of the portable terminal 100 is supported by the inclined support 202, face to face.

In accordance with an exemplary embodiment of the present invention, the inclined support 202 includes a first support 223 and a second support 221 that face the bottom surface and rear surface of the portable terminal 100, respectively. The first support 223 is fixed on the base 201 and the second support 221 extends at an incline from the first support 223. When the portable terminal 100 is mounted on the cradle 200, its bottom and rear surfaces are brought into face-to-face contact with the first support 223 and the second support 221, respectively.

The connector 203 is pivotably installed on the base 201, specifically on the inclined support 202. As the connector 203 is installed so that it protrudes partially upward from the inclined support 202, the interface connector 119 of the portable terminal contacts the protruding part of the connector 203.

The connector 203 includes a pivoting body 231 and a contact member 233. The contact member 233 extends from the outer circumferential surface of the pivoting body 231. When the pivoting body 231 is pivotably installed on the inclined support 202, the contact member 233 pivots on the inclined support 202. The protruding part of the connector 203 corresponds to the contact member 233. As explained above, the interface connector 119 is engaged with the contact member 233. The pivotable configuration of the pivoting body 231 against the inclined support 202 will be detailed below with reference to FIG. 6 and FIG. 7.

Referring to FIG. 4 and FIG. 5, the connector 203 is pivotably installed on the cradle 200, and specifically on the inclined support 202. The portable terminal 100 may be mounted or detached in a variable direction depending on the extended direction and position of the contact member 233. For instance, when the portable terminal 100 is detached, the contact member 233 may be almost parallel to the second support 221. Then the portable terminal 100 may be mounted on the cradle 200 in an arrowed direction A (in FIG. 5) and at the same time, the interface connector 119 may contact the contact member 233. Meanwhile, if the user wants to remove the portable terminal 100 from the cradle 200, he can pull the portable terminal 100 in an intended direction. This is possible because the connector 203 is pivotably installed on the inclined support 202. That is, the portable terminal 100 can be pulled off from the cradle in an arrowed direction D or D'. While only the pull-off directions D and D' are shown in FIG. 5, the portable terminal 100 can be pulled off in any direction within the pivoting range of the connector 203.

The cradle 200 further includes a cable 251 and a multi-socket 206 to connect the portable terminal 100 to various external devices such as an external speaker or an external hard disk. The cable 251 is connected to the connector 203 and the multi-socket 206 is provided at an end of the cable 251. The multi-socket 206 may include multiple sockets 261 like a serial power socket to charge the portable terminal 100 mounted on the cradle 200, a socket to output sound or images, and a Universal Serial Bus (USB) socket to connect to a medium such as an external hard disk. If the portable terminal 100 has a USB host function, a moving picture file stored in a storage medium such as an external hard disk can be reproduced through the cradle 200.

The cable 251 is composed of a plurality of conductive lines, and a first end of each conductive line is connected to a socket 261 and a second end of each conductive line is connected to the connector 203 via a circuit board (253 in FIG. 6) and a Flexible Printed Circuit (FPC) (239 in FIG. 5 and FIG. 6) in the cradle 200. The circuit board 253 functions as a distributor to connect pins of the connector 203 to the sockets 261 according to functions allocated to the pins.

Figure 7:
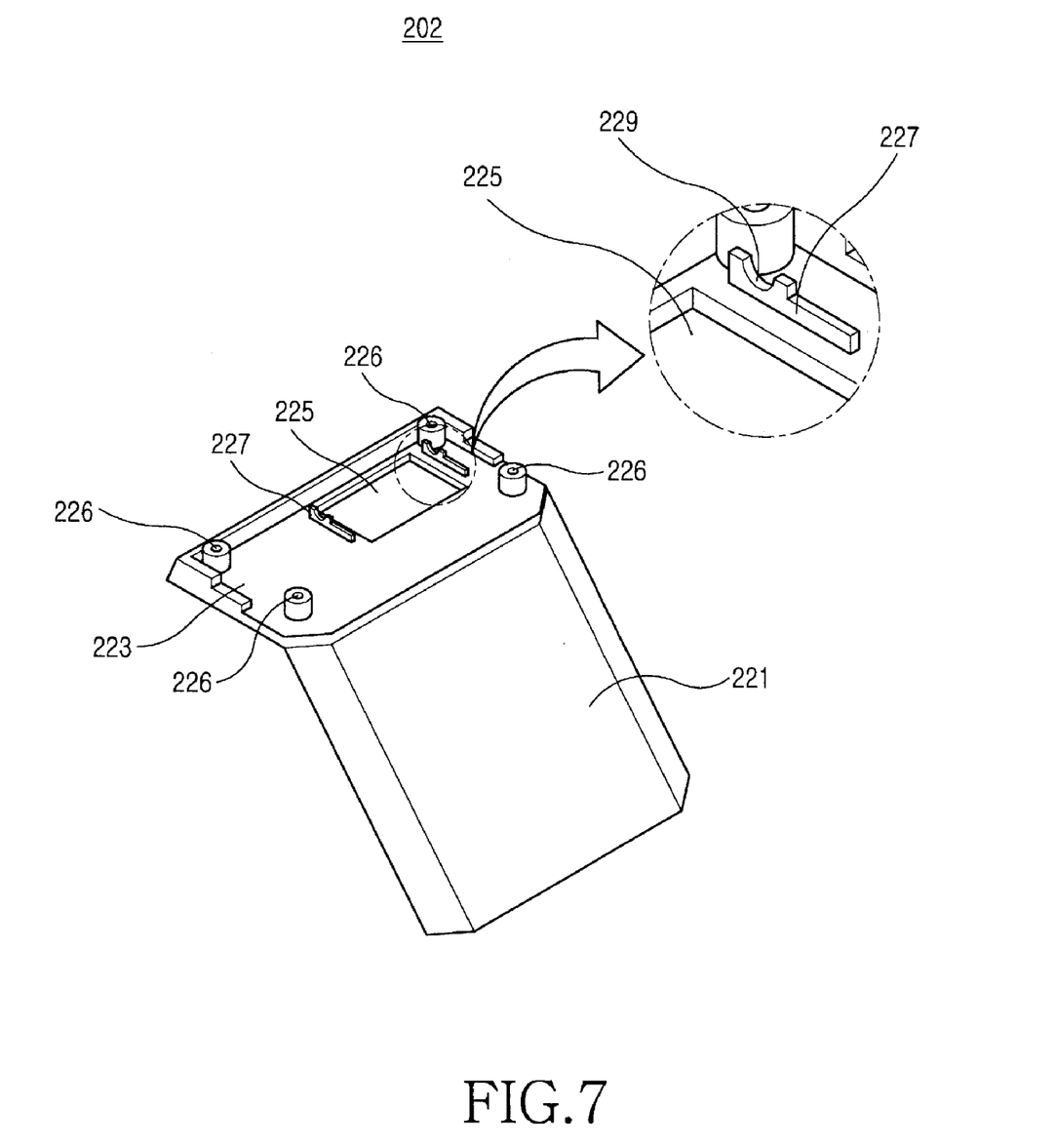
FIG. 7 is a perspective view of an inclined support of the cradle shown in FIG. 6.

With reference to FIG. 6 and FIG. 7, the configuration of the cradle 200 will be described in greater detail. In addition to the base 201, the inclined support 202, and the connector 203, the cradle 200 is provided with circuits to transfer and distribute signals to and from the connector 203 and house members to protect the circuits. As described above, the cradle 200 has the circuit board 253 and the FPC 239 to transmit and distribute signals to the connector 203. The circuit board 253 and the FPC 239 are positioned on a bottom surface of the base 201, being covered with first and second housings 204 and 205.

As stated above, the inclined support 202 is installed on the top surface of the base 201, and the first housing 204 is installed on the bottom surface of the base 201.

The first support 223 of the inclined support 202 is fixed to the base 201 and the second support 221 extends from the first support 223, receding from the base 201. The first housing 204 is installed on the bottom surface of the base 201 and screws (not shown) are engaged with the inclined support 202, specifically the first support 223, sequentially through the first housing 204 and the base 201. Thus the inclined support 202 and the first housing 204 are fixed to the base 201. To fix the first housing 204, the base 201, and the inclined support 202, screws are inserted in screw holes 219 and 245 and engagement protrusions 226 formed in the first housing 204, the base 201, and the inclined support 202.

Simultaneously with the fixed engagement of the inclined support 202 and the first housing 204 with the base 201, the connector 203 is pivotably assembled between the inclined support 202 and the first housing 204. To accommodate the connector 203, the inclined support 202 has a first opening 225 and the first housing 204 has a second opening 241. When the inclined support 202 and the first housing 204 are installed on the base 201, the first and second openings 225 and 241 are connected to each other and the connector 203 is accommodated in the second opening 241, while the contact member 233 protrudes upward from the inclined support 202 through the first opening 225.

Since the first and second openings 225 and 241 are connected to each other along with the respective installation of the inclined support 202 and the first housing 204 on the top and bottom surfaces of the base 201, a through hole 211 should be formed in the base 201. In addition, the screw holes 219 formed in the base 201 are formed around the through hole 211, for the screw engagement. When the heads of the screws are supported by the first housing 204 and the bodies thereof are engaged with the inclined support 202, the base 201 may be tightly fixed between the first housing 204 and the inclined support 202 even though the screws are not directly engaged with the base 201. Therefore, the screw holes 219 may be omitted. Yet, it is to be noted that without the screw holes 219 in the base 201, a path to allow the screws to pass through should be formed by partially expanding edges of the through hole 211.

The connector 203 is pivotably engaged between the inclined support 202 and the first housing 204 by support protrusions 232 formed at both side ends of the connector 203. The support protrusions 232 protrude from both side ends of the pivoting body 231.

First support grooves 229 are formed in the inclined support 202 and second support grooves 243 are formed in the first housing 204. When the inclined support 202 and the first housing 204 are combined with the base 201, the first support grooves 229 are face to face with the second support grooves 243. The connector 203 is positioned in the first and second openings 225 and 241 and with the face-to-face combination between the first and second support grooves 229 and 243, the first and second support grooves 229 and 243 surround the outer circumferential surface of the support protrusions 232. Therefore, the support protrusions 232 support the pivoting body 231 and provide an axis of rotation for the pivoting body 231.

Support ribs 227 are formed at both sides of the first opening 225 on the bottom surface of the inclined support 202. The first support grooves 229 are shaped to be semicircular on parts of the support ribs 227. The second support grooves 243 are formed to be semicircular on each inner wall of the second opening 241 and have stepped inner walls. When the inclined support 202 and the first housing 204 are installed to the base 201, the support ribs 227 closely contact the inner walls of the second opening 241, positioned in the first opening 225. Hence, the first and second support grooves 229 and 243 are combined, covering the outer circumferential surfaces of the support protrusions 232 and the support ribs 227 are positioned in the second opening 241. If the height of the steps of the second opening 241 is equal to the thickness of the support ribs 227, the support ribs 227 make the inner walls of the second opening 241, which include holes formed by the first and second support grooves 229 and 243, planar.

To restrict unnecessary movements of the connector 203, the connector 203 may be provided with an elastic member 209. The elastic member 209 has a first end supported by the inclined support 202 and a second end supported by the outer circumferential surface of the connector 203, specifically the outer circumferential surface of the pivoting body 231, thus offering an elastic force to rotate the connector 203 in a direction. If no external force is applied, the elastic force of the elastic member 209 causes the connector 203 to rotate in a direction that advances the contact member 233 toward the second support 221 and the contact member 233 keeps the connector 203 stationary due to interference by an inner wall of the first opening 225. While the connector 203 is kept stationary by the elastic force of the elastic member 209, the contact member 233 is positioned almost in parallel to the second support 221. In the stationary state of the connector 203, the contact member 233 does not always need to be parallel to the second support 221. Rather, the position of the contact member 233 may vary according to an environment set by a manufacturer.

The elastic member 209 includes coil portions 291 and first and second free ends 293 and 295. The coil portions 291 are wound around the outer circumferential surfaces of the support protrusions 232 and create an elastic force to rotate the connector 203 in one direction. The first ends 293 extend from the coil portions 291 and are supported by the bottom surface of the inclined support 202. The second ends 295 extend from the coil portions 291 and are supported by the outer circumferential surface of the connector 203. In an exemplary embodiment of the present invention, a coil portion 291 is provided at each side of the pivoting body 231 and the second free ends 295 extending from the coil portions 291 are connected to each other and supported by the outer circumferential surface of the pivoting body 231.

Without an external force, the elastic force of the elastic member 209 positions the contact member 233 parallel to the second support 221 and the user may mount the portable terminal 100 on the cradle 200 in the arrowed direction A as shown in FIG. 5. When the user removes the portable terminal 100 from the cradle 200, the connector 203 pivots so that the portable terminal 100 may be detached in a user-desired direction.

The second housing 205 is installed on the bottom surface of the base 201, covering the first housing 204. The circuit board 253 is installed within the second housing 205. The circuit board 253 has a circuit pattern to connect the conductive lines of the cable 251 to the pins of the connector 203. That is, the circuit pattern of the circuit board 253 connects the serial power socket 261 of the multi-socket 206 to charging pins of the connector 203, the sound/image output socket 261 to output pins of the connector 203, and the USB socket 261 to USB pins of the connector 203. The circuit board 253 is provided with a contact terminal 255 to which the conductive lines of the cable 251 are connected and another contact terminal 257 to which the FPC 239 extended form the connector 203 is connected.

When the second housing 205 contacts the base 201 and covers the first housing 204, the second housing 205 may be fixed to the base 201 by screws (not shown). In an exemplary embodiment of the present invention, engagement holes 247 and 259 are formed at corners of the first and second housings 204 and 205. That is, since the second housing 205 is fixedly engaged with the first housing 204 and the first housing 204 is engaged with the inclined support 202, the base 201 is tightly fixed between the first housing 204 and the inclined support 202.

As described above, the use of the thus-constituted cradle 200 allows the user to enjoy a variety of multimedia contents conveniently through the portable terminal 100 alone. That is, the portable terminal 100 functions as a music or moving picture file reproducer and outputs images and sound through a speaker, a monitor, or a TV connected to it via the cradle 200. In spite of insufficient capacity of a storage medium in the portable terminal 100, the portable terminal 100 may be connected to an external USB hard disk or a Digital Versatile Disk-Read Only Memory (DVD-ROM) via the cradle 200.

As is apparent from the above description, since the connector is pivotably installed on the base or the inclined support in the cradle for a portable terminal according to exemplary embodiments of the present invention, the cradle may be easy to use. Also, the portable terminal may be charged and connected to an external speaker, an earphone, an external hard disk, or a portable flash memory through the cable and the multi-socket connected to the cradle, a variety of multimedia functions of the portable terminal may be used efficiently. That is, a user may enjoy music or moving pictures conveniently by connecting the portable terminal to an external speaker, a monitor, or a TV via the cradle of exemplary embodiments of the present invention. Also, the limited storage capacity of the portable terminal may be overcome by connecting it to an external storage medium such as an external hard disk via the cradle. While the external storage medium is limited in reproduction, the reproduction is enabled through the portable terminal mounted on the cradle. Therefore, the portable terminal may act as a home-use audio or video player.

While it has been described that the multi-socket 206 of the cradle 200 includes a serial power socket, a USB socket, and a sound/image output socket, it may further include a socket to connect to a laptop computer and provide a modem function according to the usage of the cradle. Despite the appellation of the multi-socket 206, the multi-socket 206 may be configured to include only one or two of the serial power socket, the USB socket, and the sound/image output socket. In this context, the types and number of sockets in the multi-socket 206 may be determined by taking into account the specification, use environment, and fabrication cost of the cradle.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A cradle for a portable terminal, comprising:
a base;
an inclined support installed on a top surface of the base, the inclined support to support the portable terminal when the portable terminal is mounted in the cradle;
a first housing installed on a bottom surface of the base;
a screw to sequentially pass through the first housing and the base and engage with the inclined support when the inclined support is on the to surface of the base; and
a connector comprising a protruding portion that protrudes toward one surface of the inclined support, the connector to contact an interface connector of the portable terminal when the portable terminal is mounted in the cradle,
wherein the connector is installed on a bottom of the inclined support,
wherein the connector is pivotably installed between the inclined support and the first housing.

2. The cradle of claim 1, wherein the inclined support comprises:
a first support mounted on a top surface of the base comprising a bottom surface facing the top surface of the base and a top surface to face a bottom surface of the portable terminal; and
a second support extending at an incline from the first support and to face a rear surface of the portable terminal,
wherein the protruding part of the connector protrudes from the first support.

3. The cradle of claim 1, wherein the connector comprises:
a pivoting body installed to pivot on the inclined support; and
a contact member extending from the pivoting body,
wherein the protruding part of the connector is the contact member.

4. The cradle of claim 3, wherein the connector further comprises:
an elastic member comprising a first end supported by the inclined support and a second end supported by the pivoting body,
wherein the elastic member provides an elastic force to pivot the pivoting body in a first direction.

5. The cradle of claim 1, further comprising:
a cable connected to the connector; and
a multi-socket provided on an end portion of the cable,
wherein the multi-socket comprises a serial power socket, a sound/image output socket, or a Universal Serial Bus (USB) socket.

6. The cradle of claim 1, wherein a top surface of the base is curved and the inclined support is positioned on the top surface of the base.

7. The cradle of claim 1, further comprising:
a second housing installed on the bottom surface of the base, the second housing surrounding the first housing.

8. The cradle of claim 1, further comprising:
a first opening formed in the inclined support; and
a second opening formed in the first housing,
wherein when the inclined support and the first housing are installed on the base, the first opening and the second opening are connected and the connector is contained in the second opening, while the protruding portion of the connector protrudes from the bottom surface of the inclined support through the first opening.

9. A cradle for a portable terminal, comprising:
a base;
an inclined support installed on the base, the inclined support to support the portable terminal when the portable terminal is mounted in the cradle;
a connector comprising a protruding portion that protrudes toward one surface of the inclined support, the connector to contact an interface connector of the portable terminal when the portable terminal is mounted in the cradle;
a first housing installed on a bottom surface of the base;
a screw to sequentially pass through the first housing and the base and engage with the inclined support when the inclined support is on a top surface of the base;
a first opening formed in the inclined support;
a second opening formed in the first housing;
support ribs formed on a bottom surface of the inclined support at both sides of the first opening;
first support grooves formed on the support ribs;
second support grooves formed on both inner walls of the second opening; and
support protrusions extending from both side ends of the connector,
wherein the connector pivots on the inclined support,
wherein the connector is pivotably installed between the inclined support and the first housing,
wherein when the inclined support and the first housing are installed on the base, the first opening and the second opening are connected and the connector is contained in the second opening, while the protruding portion of the connector protrudes from one surface of the inclined support through the first opening,
wherein the first support grooves and the second support grooves are combined, face to face, surrounding the support protrusions so that the connector pivots upon the inclined support when the inclined support and the first housing are installed on the base.

10. The cradle of claim 9, wherein the connector further comprises an elastic member having a first end supported by the inclined support and a second end supported by the pivoting body,
wherein the elastic member provides an elastic force to pivot the connector in a first direction.

11. The cradle of claim 10, wherein the elastic member comprises:
a coil portion wound around outer circumferential surfaces of the support protrusions;
a first free end extending from the coil portion and supported by the inclined support; and
a second free end extending from the coil portion and supported by an outer circumferential surface of the connector.

12. The cradle of claim 9, wherein the connector comprises:
a pivoting body installed to pivot on the inclined support; and
a contact member extending from the pivoting body,
wherein the protruding part of the connector is the contact member.

13. The cradle of claim 12, wherein the inclined support comprises:
a first support positioned on a top surface of the base and facing a bottom surface of the portable terminal; and
a second support extending at an incline from the first support and facing a rear surface of the portable terminal,
wherein the protruding part of the connector protrudes from the first support.

14. The cradle of claim 13, wherein the connector further comprises an elastic member having one end supported by the inclined support and the other end supported by the pivoting body,
wherein the elastic member provides an elastic force to advance the connector toward the second support.

15. The cradle of claim 14, wherein the elastic member comprises:
a coil portion wound around outer circumferential surfaces of the support protrusions;
a first free end extending from the coil portion and supported by the inclined support; and
a second free end extending from the coil portion and supported by an outer circumferential surface of the connector.

16. A cradle for a portable terminal, comprising:
a base;
an inclined support installed on a top surface of the base, the inclined support to support the portable terminal when the portable terminal is mounted in the cradle;
a first housing installed on a bottom surface of the base;
a screw to sequentially pass through the first housing and the base and engage with the inclined support when the inclined support is on the top surface of the base; and
a pivotable connector having a protruding portion to couple with an interface connector of the portable terminal when the portable terminal is mounted in the cradle,
wherein the connector is installed between the inclined support and the first housing.

17. The cradle of claim 16, wherein the inclined support comprises:
a first support mounted on a top surface of the base comprising a bottom surface facing the top surface of the base and a top surface to face a bottom surface of the portable terminal; and
a second support extending at an incline from the first support and to face a rear surface of the portable terminal,
wherein the protruding part of the pivotable connector protrudes from the first support.

* * * * *